(12) United States Patent
Rybka

(10) Patent No.: US 10,300,540 B2
(45) Date of Patent: May 28, 2019

(54) ROTATABLE MEMBER WITH WORK SURFACES FOR A SAW APPARATUS

(71) Applicants: Robert Bosch Tool Corporation, Broadview, IL (US); Robert Bosch GmbH, Stuttgart (DE)

(72) Inventor: Matthew M. Rybka, Hoffman Estates, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 40 days.

(21) Appl. No.: 15/633,428

(22) Filed: Jun. 26, 2017

(65) Prior Publication Data

US 2017/0368621 A1 Dec. 28, 2017

Related U.S. Application Data

(60) Provisional application No. 62/354,898, filed on Jun. 27, 2016.

(51) Int. Cl.
| | |
|---|---|
| *B23D 47/02* | (2006.01) |
| *B23D 59/00* | (2006.01) |
| *B27B 5/29* | (2006.01) |
| *B27B 27/08* | (2006.01) |

(52) U.S. Cl.
CPC ......... *B23D 47/025* (2013.01); *B23D 59/001* (2013.01); *B27B 5/29* (2013.01); *B27B 27/08* (2013.01); *B23D 59/002* (2013.01)

(58) Field of Classification Search
CPC .. B23D 47/025; B23D 59/001; B23D 45/028; B27B 5/29; B27B 27/08
USPC ................................. 269/130; 83/490, 471.3
See application file for complete search history.

(56) References Cited

U.S. PATENT DOCUMENTS

| | | | |
|---|---|---|---|
| 6,431,042 B1 * | 8/2002 | Brault .................. | B23D 45/044 83/471.3 |
| 7,134,373 B1 * | 11/2006 | Vice ...................... | B23D 47/025 83/477.2 |
| 2004/0159200 A1 * | 8/2004 | Stoffel ................. | B23D 47/025 83/581 |

(Continued)

FOREIGN PATENT DOCUMENTS

| | | |
|---|---|---|
| JP | 4569204 B2 | 10/2010 |
| JP | 5000470 B2 | 8/2012 |

OTHER PUBLICATIONS

International Search Report and Written Opinion corresponding to PCT Application No. PCT/US2017/039298, dated Sep. 11, 2017 (14 pages).

*Primary Examiner* — George B Nguyen
(74) *Attorney, Agent, or Firm* — Maginot Moore & Beck LLP

(57) ABSTRACT

A rotatable member is mountable on a tabletop of a power tool apparatus. The rotatable member includes a first work surface and a second work surface. The first work surface is on a first side of the rotatable member. The second work surface is on a second side of the rotatable member. The second side is different from the first side. The rotatable member is configured to move into a first position such that the first work surface is level with a surface of the tabletop. In addition, the rotatable member is configured to move into a second position such that the second work surface is level with the surface of the tabletop.

20 Claims, 8 Drawing Sheets

(56) References Cited

U.S. PATENT DOCUMENTS

2007/0234864 A1* 10/2007 Bettacchini .......... B23D 47/025
                                                          83/471.3
2014/0312549 A1   10/2014  Meyer
2015/0047488 A1    2/2015  Chen et al.

* cited by examiner

ROTATABLE MEMBER WITH WORK SURFACES FOR A SAW APPARATUS

CROSS-REFERENCE TO RELATED APPLICATION

This application claims the benefit of U.S. Provisional Patent Application No. 62/354,898, which was filed on Jun. 27, 2016, and which is hereby incorporated herein by reference in its entirety.

FIELD OF THE DISCLOSURE

This disclosure relates generally to power tools, and more specifically to a rotatable member with work surfaces for power tools.

BACKGROUND

Some power tools include work surfaces, which are changeable. For example, a saw apparatus may include an insert plate, which serves as a cutting area and which is mounted on a table of the saw apparatus by several screws, e.g. four or more screws. To change the cutting area, a user, generally, has to iterate through several turning actions of each of the screws to detach the current insert plate from the saw apparatus and attach a different insert plate onto the saw apparatus. However, such a configuration has several drawbacks, as it can take a significant amount of time and effort to attach, detach, and/or adjust these insert plates, as each of the aforementioned turning actions occurs along threads of the screws.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a rotatable member is mountable on a tabletop of a power tool apparatus. The rotatable member includes a first work surface and a second work surface. The first work surface is on a first side of the rotatable member. The second work surface is on a second side of the rotatable member. The second side is different from the first side. The rotatable member is configured to move into (a) a first position such that the first work surface is level with a top surface of the tabletop and (b) a second position such that the second work surface is level with the top surface of the tabletop.

In an example embodiment, a rotatable member is configured to rotate about a rotational axis that extends parallel to a main surface of a tabletop. The rotatable member includes a first work surface and a second work surface. The first work surface is on a first side of the rotatable member. The second work surface is on a second side of the rotatable member. The second side is different from the first side. The rotatable member is configured to be in (a) a locked state in which the rotatable member is held securely in place and (b) an unlocked state in which the rotatable member is configured to (i) transition from the first work surface to the second work surface, and (ii) transition from the second work surface to the first work surface.

In an example embodiment, a power tool apparatus includes at least a turntable and a power tool. The turntable is rotatable about a first rotational axis. The turntable includes a rotatable member with at least a first work surface and a second work surface. The first work surface is on a first side of the rotatable member. The second work surface is on a second side of the rotatable member. The power tool is configured to operate on a selected work surface of the rotatable member. The rotatable member is rotatable about a second rotational axis, which is perpendicular to the first rotational axis.

These and other features, aspects, and advantages of the present disclosure are further clarified by the following detailed description of certain exemplary embodiments in view of the accompanying drawings throughout which like characters represent like parts.

DETAILED DESCRIPTION

The embodiments described above, which have been shown and described by way of example, and many of their advantages will be understood by the foregoing description, and it will be apparent that various changes can be made in the form, construction and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
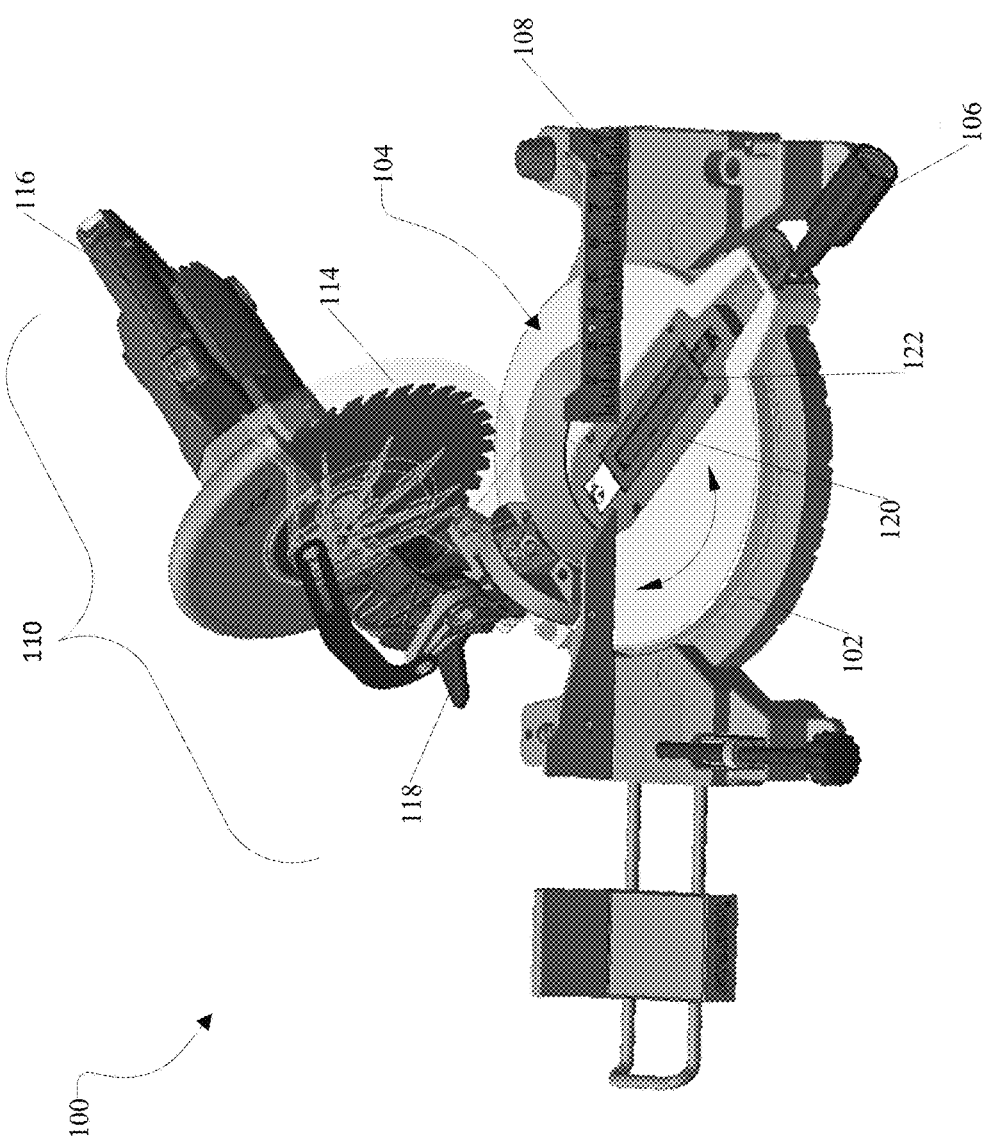
FIG. 1 is a perspective view of a power tool apparatus according to an example embodiment of the disclosure.

FIG. 1 is a perspective view of a power tool apparatus according to an example embodiment of this disclosure. In an example embodiment, the power tool apparatus is a saw apparatus 100, such as a miter saw apparatus. In FIG. 1, for example, the saw apparatus 100 includes at least a saw-head unit 110. In this example, the saw-head unit 110 includes at least a motor (not shown), a bevel lock knob 118, a switch handle 116, and a blade 114. Also, in FIG. 1, the saw apparatus 100 includes at least a base 102, a turntable 104, a miter lock knob 106, a fence 108, and the like. In an example embodiment, the turntable 104 includes at least a mounting portion 120 and a rotatable member 122, as well as a locking mechanism (e.g., locking mechanism of FIGS. 7A-7B or locking mechanism of FIGS. 8A-8B). Additionally or alternatively, the saw apparatus 100 can include other components, which have not been specifically mentioned.

Figure 3:
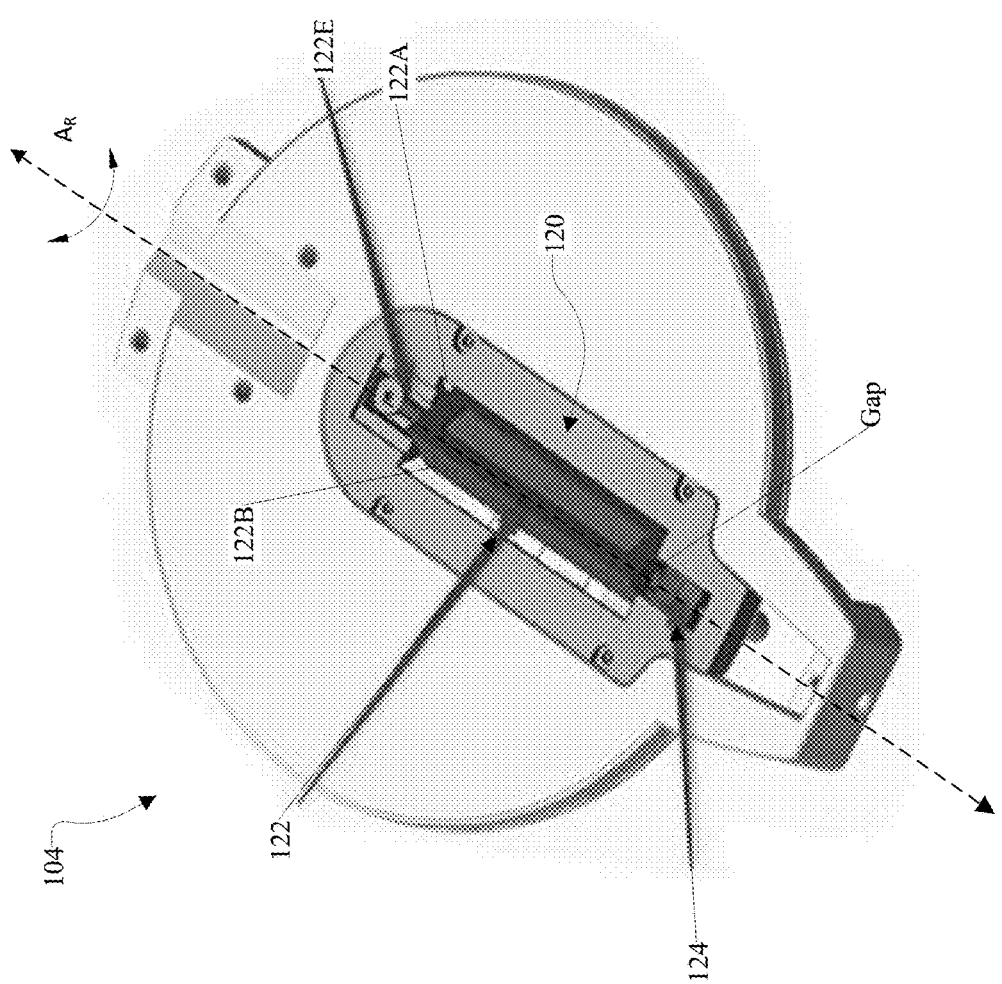
FIG. 3 is a perspective view of a rotatable member, transitioning work surfaces, in an unlocked state according to an example embodiment of the disclosure.

As shown in FIG. 1, the power tool is configured to coincide with one of the work surfaces of the rotatable member 122. More specifically, in this example, the blade 114 is configured to operate on one of the work surfaces of the rotatable member 122 without contacting or cutting into a top surface (or tabletop) of the turntable 104. In addition, the rotatable member 122 is configured to rotate, as shown in FIG. 3, such that the blade 114 is configured to operate on another one of the work surfaces of the rotatable member 122. In this regard, the rotatable member 122 is positioned within the turntable 104.

Figure 2:
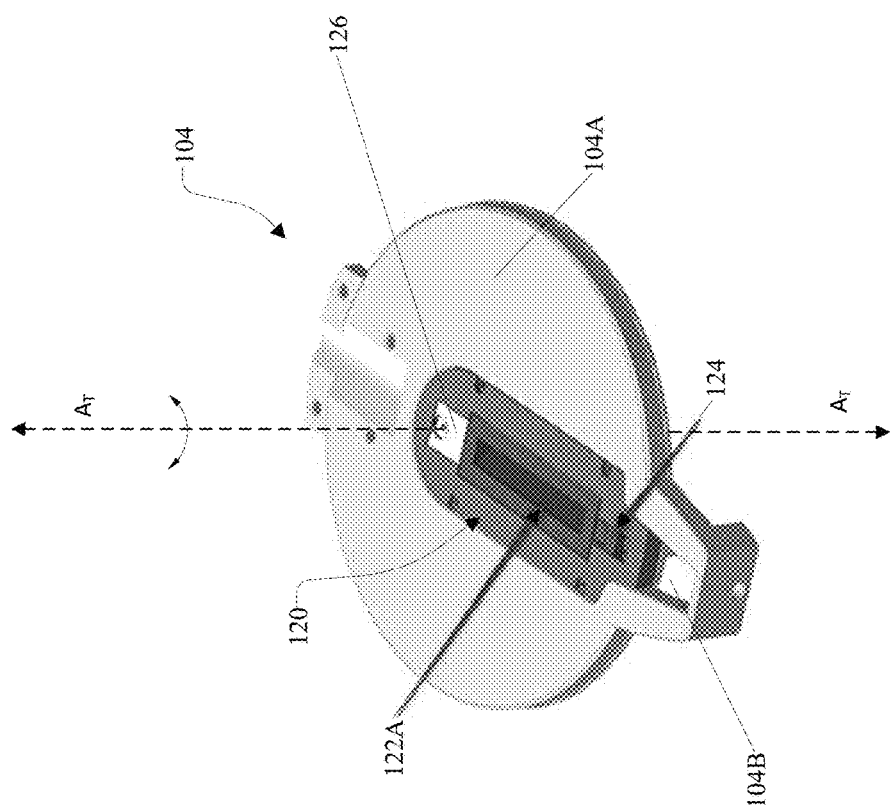
FIG. 2 is a perspective view of a turntable according to an example embodiment of the disclosure.

FIG. 2 is a perspective view of the turntable 104 according to an example embodiment. The turntable 104 includes a tabletop with a support surface 104A, which is structured to support a workpiece. The turntable 104 comprises any suitable material. In an example embodiment, the turntable 104 is a metal material comprising at least one metal. In an example embodiment, the turntable 104 is rotatable relative to the base 102. For instance, in this example, the turntable 104 is rotatable about a rotational axis $A_T$ such that a user is enabled to select a miter angle for the power tool. In an example embodiment, the saw-head unit 110 and the turntable 104 are configured to lock into a selected position corresponding to a selected miter angle by a locking device provided by miter lock knob 106. Also, in an example embodiment, the turntable 104 includes a miter scale 112 (FIG. 5) on the base 102 in which the current miter angle is viewable via an opening 104B in a portion of the turntable 104. In addition, the turntable 104 is provided with a rotatable member 122 with a plurality of work surfaces. To enable the power tool to utilize a selected one of the plurality of the work surfaces effectively, the rotatable member 122 is provided with an unlocked state and a locked state.

Figure 4:
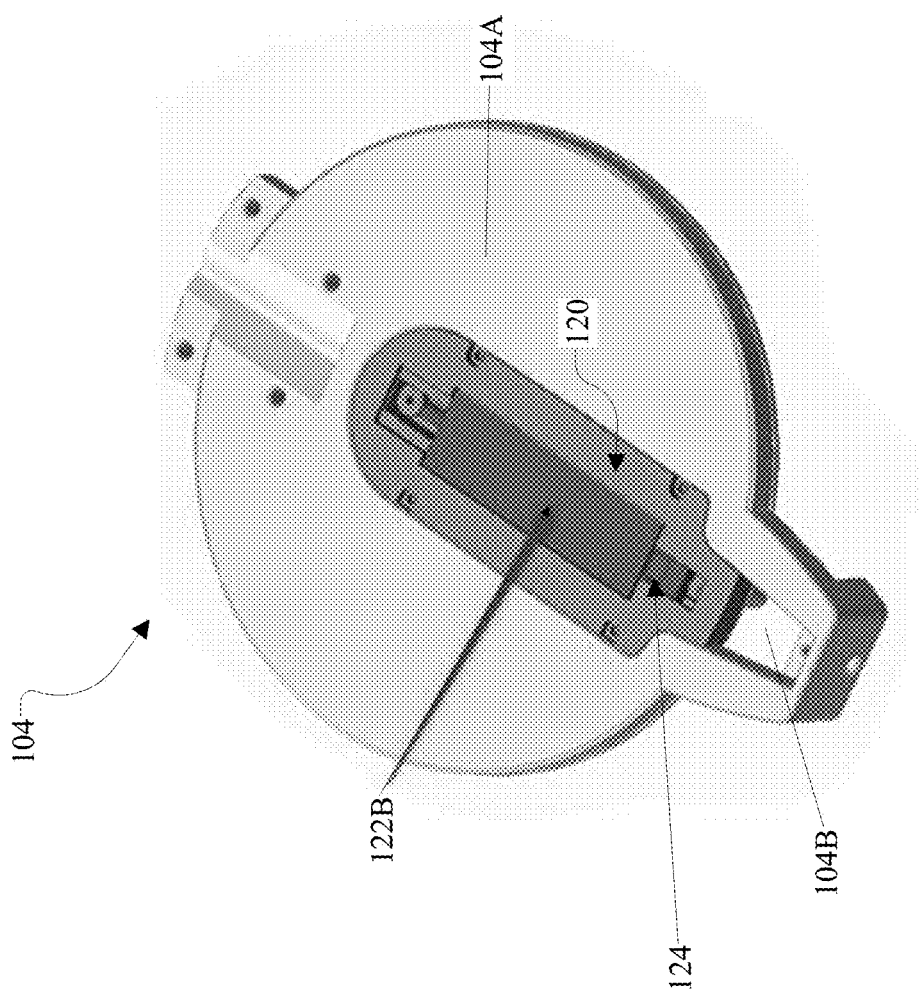
FIG. 4 is a perspective view of the rotatable member, providing a secure work surface, in a locked state according to an example embodiment of the disclosure.

FIGS. 2-4 illustrate the rotatable member 122 in various states according to an example embodiment. More specifically, FIG. 2 illustrates an example of the locked state in which a first work surface 122A of the rotatable member 122 is level or flush with the support surface 104A of the turntable 104. FIG. 3, on the other hand, illustrates an example of the unlocked state in which the rotatable member 122 is configured to rotate within the turntable 104 and transition work surfaces 122A/122B/122C. Meanwhile, FIG. 4 illustrates an example of the locked state in which a second work surface 122B of the rotatable member 122 is level or flush with the support surface 104A of the turntable 104.

In an example embodiment, when the rotatable member 122 is in the locked state, the rotatable member 122 is prevented from rotating about its rotational axis $A_R$. This locked state is advantageous in securely holding the rotatable member 122 such that the selected work surface is stable and secure for use in conjunction with the power tool. In contrast, in the unlocked state, the rotatable member 122 is free to rotate about its rotational axis $A_R$. In this regard, for example, the rotatable member 122 is configured to rotate about its rotational axis $A_R$ in either a first direction (e.g., a clockwise direction) or a second direction (e.g., counterclockwise direction). This unlocked state is advantageous in enabling a user to quickly switch from one work surface to another work surface by simply moving the rotatable member 122 about its rotational axis $A_R$. As shown in FIGS. 2-4, the rotatable member 122 is positioned within the turntable 104 when in the locked state and when in the unlocked state. This feature is advantageous in that the user does not have to remove the rotatable member 122 from the turntable 104 to use a different work surface.

In an example embodiment, the turntable 104 is structured to include a mounting portion 120 for the rotatable member 122. In an example embodiment, the mounting portion 120 and the turntable 104 comprise a monolithic structure. In this regard, for example, the mounting portion 120 and the turntable 104 comprise a single structure of the same material in which the features of the mounting portion 120 are an integral part of the turntable 104. Alternatively, in an example embodiment, the mounting portion 120 and the turntable 104 are distinct components comprising same or different materials that are fixedly attached or connected to each other by, for example, welding, adhesive, or the like. In yet another embodiment, the mounting portion 120 and the turntable 104 are distinct components, which are attachable and detachable from each other, as shown in FIG. 5.

Figure 5:
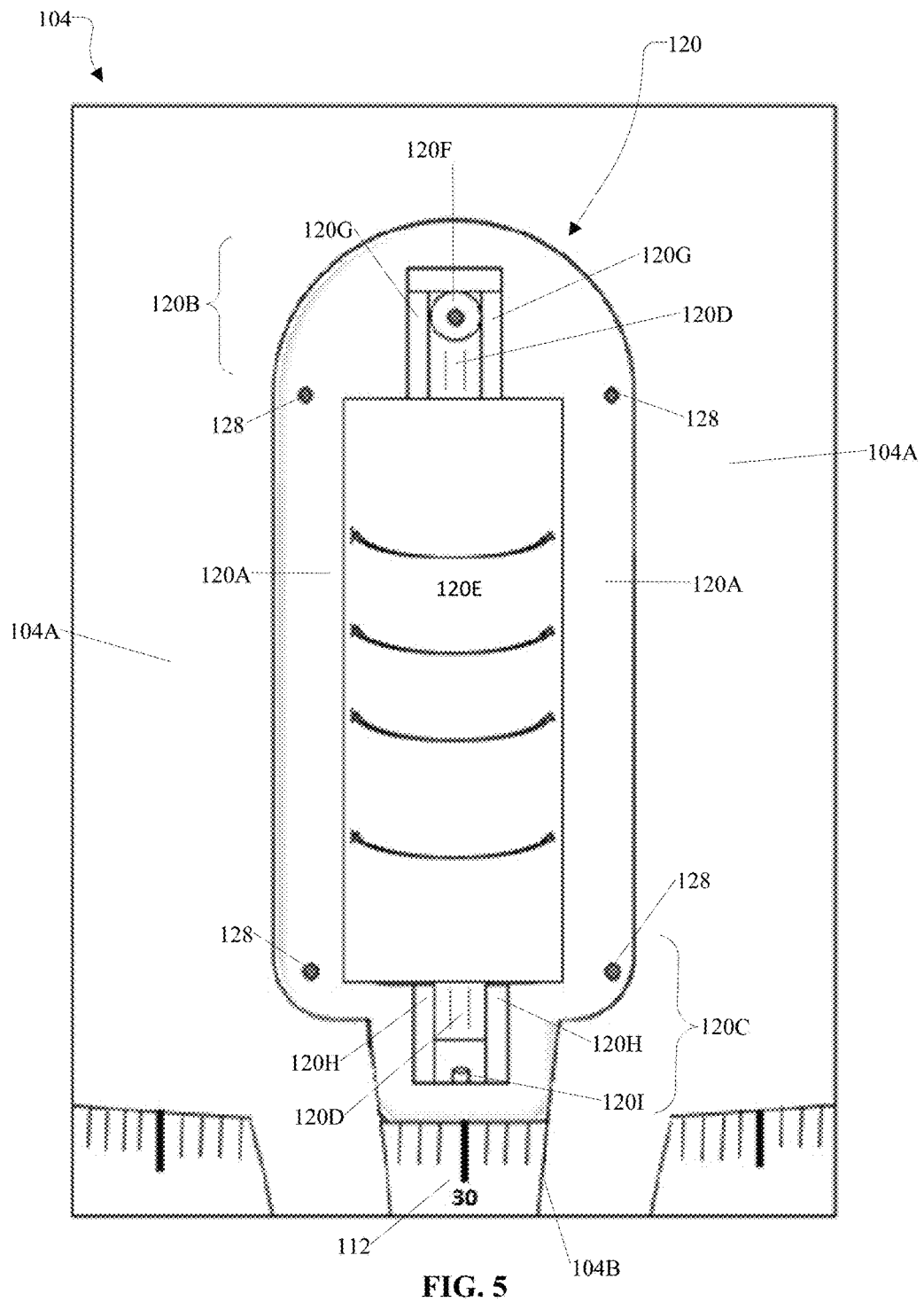
FIG. 5 is a top view of a mounting portion in relation to the turntable according to an example embodiment of the disclosure.

FIG. 5 is a top view of the mounting portion 120 in relation to the turntable 104 according to an example embodiment. In this example embodiment, the mounting portion 120 is distinct from the turntable 104. In this regard, for example, the mounting portion 120 comprises a metal material, a glass-filled nylon, a polycarbonate, a thermoplastic polymer (e.g., acrylonitrile butadiene styrene (ABS)), a phenolic material, a plastic material, any suitable material, or any suitable combination thereof. For example, as shown, the mounting portion 120 is attachable to and detachable from the turntable 104 via mechanical fasteners 128. For example, in this disclosure, a mechanical fastener refers to any hardware device that joins, affixes, or assists in the joining of at least two components to each other. Non-limiting examples of mechanical fasteners 128 include screws, clips, bolts, nuts, and other suitable devices. In an example embodiment, the surface 120A of the mounting portion 120 is level or substantially level with the support surface 104A of the turntable 104. More specifically, in FIG. 5, the mounting portion 120 has a surface 120A that is flush or substantially flush with the support surface 104A of the turntable 104.

In an example embodiment, the mounting portion 120 comprises any suitable shape provided that the mounting portion 120 is configured to receive and accommodate the rotatable member 122. In FIG. 5, for example, the mounting portion 120 comprises a generally elongated shape with a curved portion 120B at one end thereof and a tapered portion 120C at an opposite end thereof. The curved portion 120B is advantageous in distributing and handling stress, thereby increasing and improving the durability of the mounting portion 120. Also, in FIG. 5, the tapered portion 120C is structured to effectively utilize a part of the space provided by the opening 104B of the turntable 104. In addition, the tapered portion 120C enables the mounting portion 120 to fit securely and properly within the turntable 104. Moreover, in this example embodiment, the shape of the mounting portion 120 is structured to ensure that the mounting portion 120 is properly oriented and installed in the turntable 104. In this example, the mounting portion 120 is properly installed within the turntable 104 when the tapered portion 120C, which includes the locking mechanism, is situated at an outer portion of the turntable 104 such that the locking mechanism is easily accessible to the user.

In an example embodiment, the mounting portion 120 includes an opening 120E, as shown in FIG. 5, to receive the rotatable member 122. In an example embodiment, the opening 120E provides sufficient clearance for the rotatable member 122 to rotate about its rotational axis $A_R$ within the turntable 104. In addition, the clearance is sized such that at least a selected one of the work surfaces is configured to be level or flush with the support surface 104A of the turntable 104. In this regard, the mounting portion 120 is structured to accommodate the rotatable member 122.

In an alternative example embodiment (not shown), the mounting portion 120 includes a recess portion, which is configured to receive the rotatable member 122. More specifically, the recess portion includes a recessed surface, which is positioned below the support surface 104A of the turntable 104. The recess portion provides sufficient clearance for the rotatable member 122 to rotate about its rotational axis $A_R$. In addition, the clearance is sized such that a selected one of the work surfaces of the rotatable member 122 is configured to be level or flush with the support surface 104A of the turntable 104. In this regard, the mounting portion 120 is structured to accommodate the rotatable member 122.

In an example embodiment, the mounting portion 120 includes rotating structures 120D at opposite ends of the opening 120E. More specifically, one of the rotating structures 120D is at least partly positioned within the curved portion 120B and the other one of the rotating structures 120D is at least partly positioned within the tapered portion 120C. In an example embodiment, the rotating structures 120D comprise any suitable mechanism that enables the rotatable member 122 to rotate within the mounting portion 120. For example, in FIG. 5, the rotating structures 120D include grooves, which are structured to receive rotating rods 122E of the rotatable member 122 as depicted in at least FIG. 3. In this example, the grooves are structured such that the rotatable member 122 is configured to rotate via its rotating rods 122E when in the unlocked state. In addition, the grooves are structured such that the rotating rods 122E are securely seated therein when in the locked state.

In an example embodiment, the mounting portion 120 includes a device 120F. In an example embodiment, the device 120F is structured to receive a mechanical fastener, which connects a cover 126 (FIG. 2) to the mounting portion 120. For example, in FIG. 5, the device 120F includes a threaded hole to receive a screw, which is configured to connect the cover 126 to the mounting portion 120. For example, in FIG. 5, the device 120F is a cylindrical structure, a rectangular structure, or any suitably shaped structure. In an example embodiment, the device 120F is spaced from the rotating rods 122E. However, in an alternative embodiment, the device 120F is positioned such that a surface portion of the device 120F is configured to engage with an end portion of one of the rotating rods 122E. In this regard, the device 120F is structured as a rotation point for one of the rotating rods 122E such that the rotatable member 122 is enabled to rotate in a proper manner.

Figure 7B:
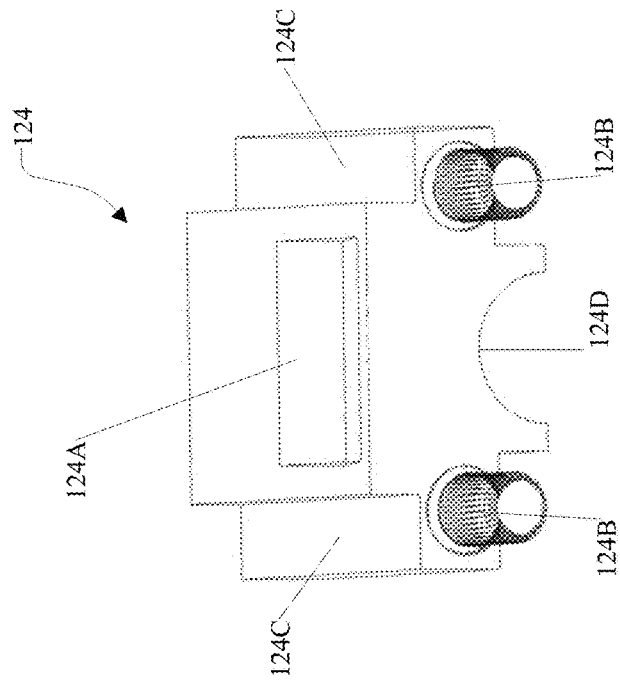
FIGS. 7A and 7B are perspective views of components of a locking mechanism according to an example embodiment of the disclosure.

In an example embodiment, the mounting portion 120 includes a lock receiving portion, which is configured to accommodate a locking mechanism. In FIG. 5, for example, the lock receiving portion includes guide members 120H, which are configured to receive a lock 124 (FIG. 7B). In an example embodiment, the guide members 120H are positioned at opposite sides of the rotating structure 120D within the tapered portion 120C of the mounting portion 120. More specifically, the guide members 120H are structured such that the lock 124 as depicted in FIGS. 2-4 is configured to interact and engage with the rotatable member 122 to provide the unlocked and locked states. In this regard, for example, the guide members 120H are slots, grooves, or groove-like formations, which are configured to receive guide rails 124C of the lock 124 as depicted in FIG. 7B and enable the guide rails 124C of the lock 124 to move therein by a sliding motion.

In an example embodiment, the mounting portion 120 includes ledges 120G. For example, in FIG. 5, the ledges are positioned at opposite sides of the rotating structure 120D within the curved portion 120B. In an example embodiment, the ledges 120G are positioned such that there is sufficient clearance for at least the rotating structure 120D, the device 120F, and the rotating rods 122E of the rotatable member 122. With this configuration, the ledges 120G are structured to provide support to the cover 126 (FIG. 2).

In an example embodiment, the cover 126 is attachable and detachable from the mounting portion 120 by a mechanical fastener (e.g. a screw), which connects the cover 126 to the device 120F. In an example embodiment, the cover 126 is structured to protect any underlying components, such as the rotating structure 120D and the device 120F. In addition, when the rotatable member 122 is mounted within the mounting portion 120, the cover 126 is configured to protect one of the rotating rods 122E of the rotatable member 122. In an example embodiment, the cover 126 is configured to ensure that external factors, such as debris from the workpiece, do not influence, affect, or interfere with the rotational mechanisms of the rotatable member 122.

Figure 6:
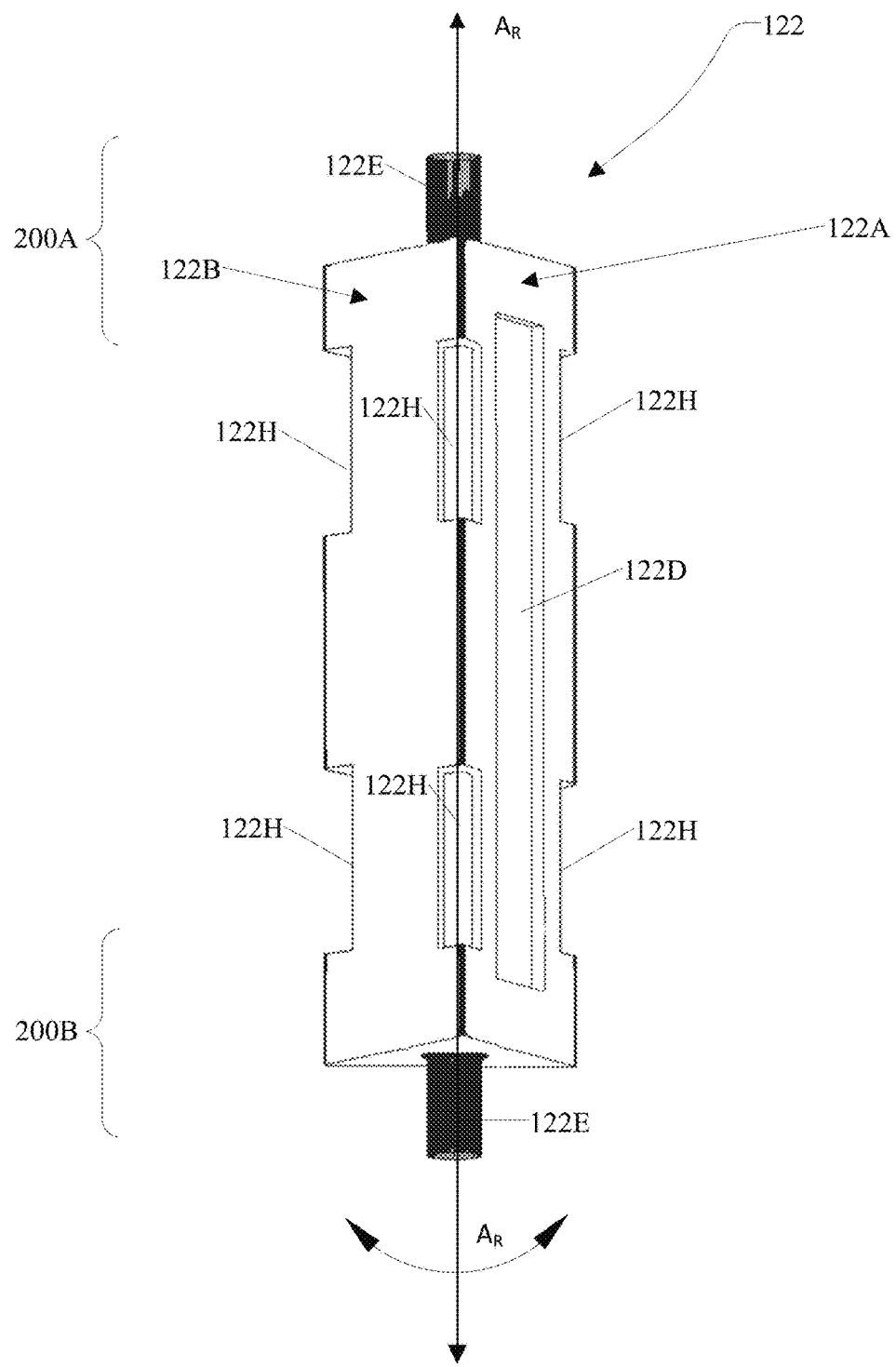
FIG. 6 is a perspective view of the rotatable member according to an example embodiment of the disclosure.

FIG. 6 is a perspective view of the rotatable member 122 according to an example embodiment. In an example embodiment, the rotatable member 122 is an elongated structure. In this regard, the rotatable member 122 is a suitable length such that a sufficient sized work surface is provided. More specifically, in this illustrated example, the rotatable member 122 is an elongated prism structure with at least a first work surface 122A, a second work surface 122B, and a third work surface 122C. In this regard, for example, the first work surface 122A is on a first side of the rotatable member 122, the second work surface 122B is on a second side of the rotatable member 122, and the third work surface is on a third side of the rotatable member 122. FIG. 6 illustrates a perspective view in which two of the three sides of the rotatable member 122 are visible.

As shown in FIG. 6, the rotatable member 122 includes a first end portion 200A and a second end portion 200B. In an example embodiment, the first and second end portions 200A and 200B include mechanical structures that enable the rotatable member 122 to rotate about its rotational axis $A_R$. For instance, in FIG. 6, the rotatable member 122 includes rotating rods 122E (or rod-like structures 122E) at each of the first and second end portions 200A and 200B. In this regard, the rotating rods 122E enable the rotatable member 122 to rotate about its rotational axis $A_R$, for example, when disposed within the grooves of the rotating structures 120D of the mounting portion 120. In an alternative embodiment, to enable the rotatable member 122 to rotate within the mounting portion 120, the rotatable member 122 includes grooves of a suitable configuration instead of rotating rods 122E at the first and second end portions 200A and 200B while the mounting portion 120 includes rotating rods 122E instead of grooves as its rotating structures 120D.

In an example embodiment, the rotatable member 122 is rotatable relative to the mounting portion 120, the turntable 104, or both the mounting portion 120 and the turntable 104. For instance, as shown in FIGS. 3 and 6, the rotatable member 122 is configured to rotate about its rotational axis $A_R$. In an example embodiment, the rotational axis $A_R$ of the rotatable member 122 is perpendicular to the rotational axis $A_T$ of the turntable 104. In an example embodiment, as shown in FIG. 3, the rotational axis $A_R$ of the rotatable member 122 is parallel or substantially parallel to a top surface of the turntable 104. In this regard, for example, the rotatable member 122 is similar to a rotatable drum or a rotatable drum-like structure.

In an example embodiment, the rotatable member 122 comprises a suitable material for the desired application. For instance, in an example embodiment, when applied to a miter saw apparatus, the rotatable member 122 comprises a glass-filled nylon, a polycarbonate, a thermoplastic polymer (e.g., acrylonitrile butadiene styrene (ABS)), a phenolic material, a plastic material, any durable and cutable material, or any suitable combination thereof. In an example embodiment, the rotatable member 122 comprises a single material or a plurality of materials.

In an example embodiment, the rotatable member 122 includes a plurality of work surfaces, where the plurality of work surfaces comprise a single material or a plurality of materials. In this regard, for example, the rotatable member 122 and each of the plurality of work surfaces can be constructed of the same material. As another example, for instance, the rotatable member 122 includes at least a first work surface of a first material and a second work surface of a second material, where the first material is different from the second material. Such a configuration of the rotatable member 122 is advantageous in enabling a user to switch quickly between work surfaces of different materials with relative ease.

In an example embodiment, the plurality of work surfaces are the same structural type, different structural types, or any combination thereof. For instance, non-limiting examples of the different types of work surfaces include a zero-clearance work surface, a slotted work surface, an adjustable work surface, and the like. In general, the zero-clearance work surface is a flat surface without any slots, openings, through-holes, recesses, or the like. In this regard, for instance, the zero-clearance work surface is advantageous in providing full support and stability to the workpiece while enabling the user to cut into the work surface, if necessary. As an example of another type, the slotted work surface is generally a flat surface with a manufactured slot. In this regard, for instance, the slotted work surface is advantageously structured to provide clearance to a blade at different angles. Also, as an example of yet another type, the adjustable work surface generally comprises two parts in which a slot can be created based on the positioning of these two parts. The adjustable work surface is advantageous in that the size of the slot can be set by the user. Although not discussed in further detail, the rotatable member 122 can include other types of work surfaces.

In an example embodiment, the rotatable member 122 includes a vent comprising an aperture 122H or any suitable structure that enables dust, chips, debris, and/or the like to pass through. Each aperture 122H comprises any suitable shape. For example, in FIG. 6, each aperture 122H is rectangular or substantially rectangular in shape. In addition, each aperture 122H is positioned at a location of the rotatable member 122 that does not interfere with the ability of any one of the work surfaces ability to provide stability and support to the workpiece. For example, in FIG. 6, the rotatable member 122 includes apertures 122H on edge portions of each of the first work surface 122A, the second work surface 122B, and the third work surface 122C. More specifically, in FIG. 6, each aperture 122H on a first edge portion (or left edge portion) of the first work surface 122A is aligned with a corresponding aperture 122H on a second edge portion (or right edge portion) of the second work surface 122B. Also, in FIG. 6, each aperture 122F on a second edge portion (or right edge portion) of the first work surface 122A is aligned with a corresponding aperture 122H on a first edge portion (or left edge portion) of the second work surface 122B. In addition, each aperture 122H on a first edge portion (or left edge portion) of the second work surface 122B is aligned with a corresponding aperture 122H on a second edge portion (or right edge portion) of the third work surface 122C.

As discussed above, in an example embodiment, the apertures 122F are strategically positioned on edge portions, which are aligned. This feature advantageously allows some of the particles from the workpiece to pass through the rotatable member 122 itself. For example, in FIG. 6, the rotatable member 122 comprises a triangular prism shape, which is configured to direct some of the particles to an area outside of the rotatable member 122. More specifically, in FIG. 6, when particles (e.g., dust, chips, debris, or the like) pass through at least one of the apertures 122F of the selected work surface, these particles may then pass through the rotatable member 122 and/or through the interior of the rotatable member 122. In the latter case, the two non-selected work surfaces are inclined and configured to direct particles towards the vertex of the two non-selected work surfaces such that these particles are enabled to pass through the apertures 122F at the vertex of the rotatable member 122. Accordingly, the apertures 122H, as shown in FIG. 6, advantageously provide a vent or vent-like structure through which some particles can be removed from at least the selected work surface, as well as from the rotatable member 122 itself.

Figure 7A:
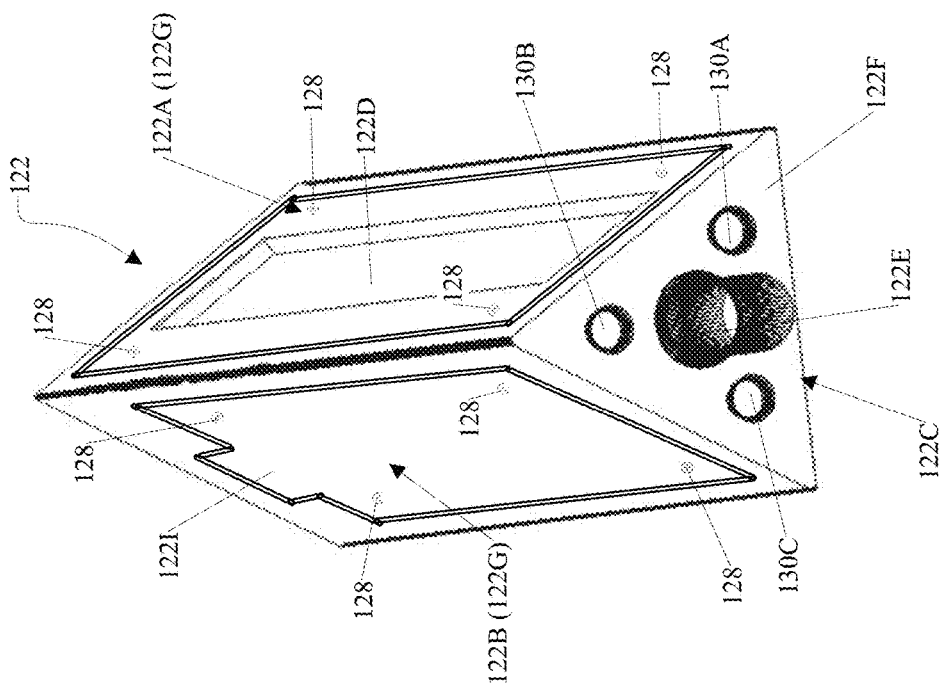

In an example embodiment, the rotatable member 122 includes at least one work surface, which is attachable and detachable from the rotatable member 122 via mechanical fasteners 128. More specifically, the attachable and detachable work surface is provided by an insert plate 122G. Each insert plate 122G can include a work surface of any structural type (e.g., a zero-clearance work surface, a slotted work surface, an adjustable work surface, or the like). By being attachable and detachable, a work surface, provided by one insert plate 122G, can be replaced with another work surface, provided by another insert plate 122G, without replacing the rotatable member 122 itself. In addition, the user is able to customize the rotatable member 122 by changing one or more insert plates 122G of the rotatable member 122 at any time (e.g., when the rotatable member 122 is disposed within the turntable 104 or when the rotatable member is removed from the turntable 104). In this regard, the rotatable member 122 can include any suitable number of insert plates 122G. As a non-limiting example, FIG. 7A illustrates the first work surface 122A as being an insert plate 122G, which is attachable to and detachable from the rotatable member 122 via mechanical fasteners 128 that are strategically positioned so that they do detract from the first work surface 122A and/or the power tool. FIG. 7A also illustrates the second work surface 122B as being an insert plate 122G, which is attachable to and detachable from the rotatable member 122 via mechanical fasteners 128 that are strategically positioned so that they do detract from the second work surface 122B and/or the power tool. In this example, the insert plate 122G, corresponding to the second work surface 122B, includes a tab 122I, thereby enabling the insert plate 122G to be inserted or removed from the rotatable member 122 with ease. As discussed above, when the rotatable member 122 includes at least one insert plate 122G, the rotatable member 122 can be customized with at least one work surface in accordance with the user's needs.

As aforementioned, the rotatable member 122 is configured to include a plurality of work surfaces, e.g., two or more work surfaces. For example, when accommodating two work surfaces, the rotatable member 122 is configured to be any suitable geometric shape having at least two sides, where each side is configured to include a work surface of any structural type. In this regard, for instance, when accommodating two work surfaces, the rotatable member 122 comprises a plate, which is structured with sufficient thickness such that each of its two work surfaces is able to provide separate and non-interfering cutting paths for the blade 114. In this example, the first work surface is positioned on one side of the plate and the second work surface is positioned on an opposite side of the plate.

As another example, when accommodating three work surfaces, the rotatable member 122 is configured to be any suitable geometric shape having at least three sides, where each side is configured to include a work surface of any structural type. In FIG. 6, for example, the rotatable member 122 is configured as a triangular prism in which the three work surfaces comprise the three elongated sides of the triangular prism. As shown, each work surface of this geometric shape provides sufficient space for a cutting path of the blade 114. More specifically, in this example, the rotatable member 122 includes a first work surface 122A of a slotted type (e.g., a work surface with slot 122D), a second work surface 122B of a zero-clearance type, and a third work surface 122C of a zero-clearance type. Alternatively, the rotatable member can include any arrangement of these work surfaces with respect to the sides of the rotatable member 122.

Although embodiments involving rotatable members 122 with two work surfaces and three work surfaces were discussed above, the rotatable member 122 is configured to include any suitable number of work surfaces. In this regard, for example, although not specifically discussed in detail above, the rotatable member 122 can be configured with four or more work surfaces. For example, in a case in which the rotatable member 122 includes four work surfaces, the rotatable member 122 can comprise a rectangular prism shape or any suitable geometric shape with at least four sides. In this regard, the geometric shape of the rotatable member 122 is not limited provided that the rotatable member 122 is able to provide a plurality of work surfaces, which are appropriate for the power tool.

As discussed above, the rotatable member 122 is provided with a plurality of work surfaces. In order to enable a user to select and utilize one of the plurality of work surfaces, the rotatable member is provided with the unlocked state and the locked state. In an example embodiment, these states of the rotatable member 122 relative to the mounting portion 120 can be provided by a suitable locking mechanism. For instance, FIGS. 7A-7B and FIGS. 8A-8B illustrate example embodiments of locking mechanisms.

FIGS. 7A and 7B are perspective views of components of the locking mechanism according to an example embodiment. More specifically, in this example embodiment, the locking mechanism includes a lock 124, which is configured to interact and engage with the rotatable member 122. In this regard, for example, the lock 124 is configured to move from a first position (FIG. 3), which provides the unlocked state, to a second position (FIGS. 2 and 4), which provides the locked state. In addition, the lock 124 is configured to move from the second position (FIGS. 2 and 4), which provides the locked state, to the first position (FIG. 3), which provides the unlocked state. In an example embodiment, the lock 124 is spring-loaded such that the movements of the lock are coordinated with the movements of a spring (not shown), which is retained, for example, by spring retainer 1201 (FIG. 5) of the mounting portion 120.

In an example embodiment, the lock 124 includes a recess portion 124A, which enables a user to easily manipulate and move the lock 124. In addition, in an example embodiment, the lock 124 includes guide rails 124C, which are positioned at opposite sides of the lock 124. In an example embodiment, the guide rails 124C of the lock 124 are configured to slide within the guide members 120H (FIG. 5) of the mounting portion 120 such that the lock 124 is configured to transition from the unlocked state to the locked state, and vice versa.

In an example embodiment, the lock 124 includes a contoured part 124D, which is structured to receive a rotating rod 122E of the rotatable member 122. In an example embodiment, the contoured part 124D is configured to hold the rotatable member 122 when engaged with the lock 124 in the locked state. In addition, the contoured part 124D enables the lock 124 to slide into the second position and over the rotating rod 122E such that an end surface of the lock 124 contacts an end surface 122F of the rotatable member 122, as shown in FIGS. 2 and 4. In addition, the contoured part 124D is structured with sufficient clearance such that the rotatable member 122 is able to rotate when the lock 124 is in the first position and in the unlocked state.

In an example embodiment, when the lock 124 is in the first position and in the unlocked state, the mating members of the lock 124 are spaced from the mating members of the rotatable member 122 by a gap, as shown in FIG. 3. In this regard, since the lock 124 does not mate with the rotatable member 122, the rotatable member 122 is free to rotate in any direction. In contrast, when the lock 124 is in the second position and in the locked state, the mating members of the lock 124 are engaged with the mating members of the rotatable member 122, as shown in FIGS. 2 and 4. In this regard, since the lock 124 is engaged with the rotatable member 122, the rotatable member 122 is held in place and unable to rotate.

In an example embodiment, the rotatable member 122 includes mating members on one end surface 122F of either the first end portion 200A or the second end portion 200B. For example, in FIG. 7A, the mating members of the rotatable member 122 are female members 130A, 130B, and 130C. In this regard, each of the female members 130A, 130B, and 130C are structured to mate with any one of the male members 124B of the lock 124. Alternatively, in another example embodiment (not shown), the mating members are reversed from that of FIGS. 7A-7B such that the rotatable member 122 includes the male members (e.g., three male members 124B) and the lock 124 includes the female members (e.g., two female members 130A and 130B).

In an example embodiment, the lock 124 is configured to provide a locked state to a selected work surface by mating with the corresponding mating members of the selected work surface. For example, in FIGS. 7A-7B, the male members 124B of the lock 124 are configured to mate with the corresponding female members 130A and 130B of the first work surface 122A when the first work surface 122A is level or flush with the support surface 104A. On the other hand, the male members 124B of the lock 124 are configured to mate with the corresponding female members 130B and 130C of the second work surface 122B when the second work surface 122B is level or flush with the support surface 104A. Also, in another instance, the male members 124B of the lock 124 are configured to mate with the corresponding female members 130C and 130A of the third work surface 122C when the third work surface 122C is level or flush with the support surface 104A. As demonstrated above, the rotatable member 122 is configured to securely hold and lock any one of the work surfaces when properly positioned.

Figure 8B:
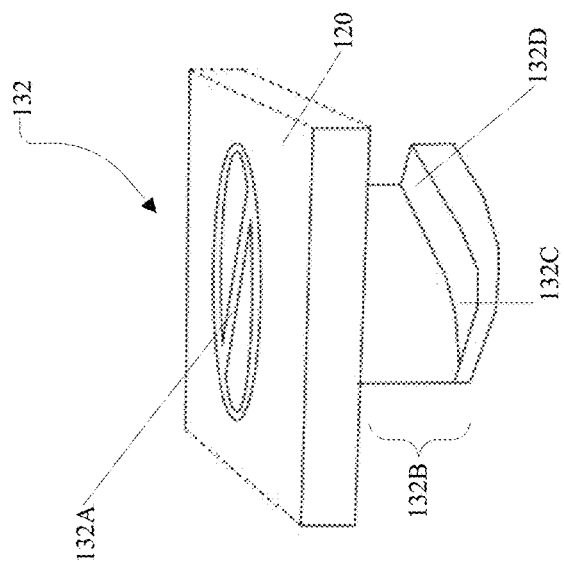
FIGS. 8A and 8B are perspective views of components of a locking mechanism according to an alternative example embodiment of the disclosure.
Figure 8A:
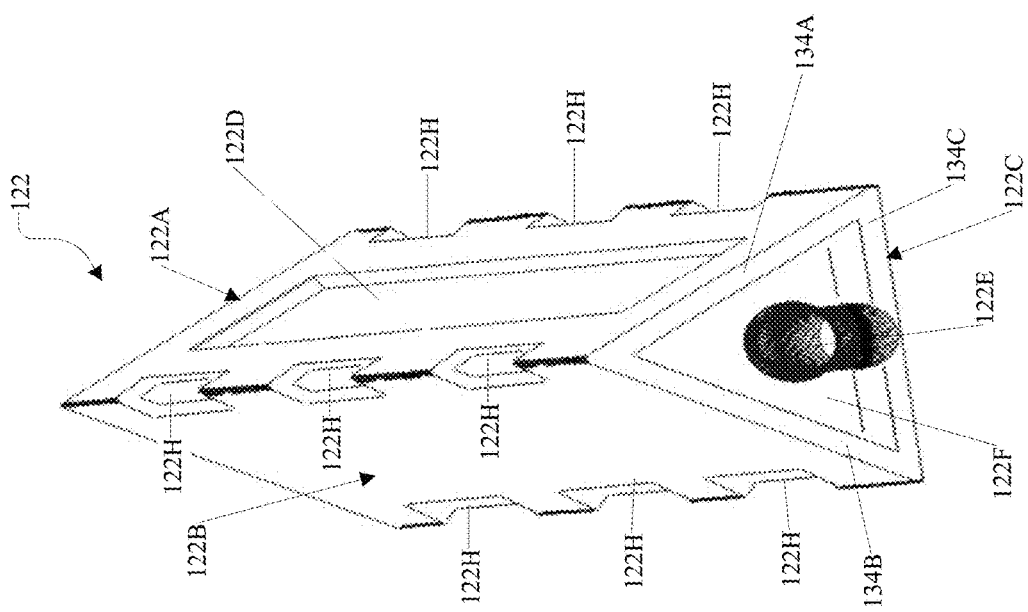

FIGS. 8A and 8B are perspective views of components of a locking mechanism according to alternative example embodiment. More specifically, in this example embodiment, the locking mechanism comprises a cam lock 132, which is configured to be mounted on the mounting portion 120. In an example embodiment, the cam lock 132 is positioned within the mounting portion 120 at a location that is similar to that of lock 124 (FIG. 2) so that the user is provided with easy access to the cam lock 132. In addition, the cam lock 132 is positioned within the mounting portion 120 such that the cam lock 132 is configured to interact and engage with the rotatable member 122. More specifically, the cam lock 132 is configured to rotate from a first position, which provides the unlocked state, to a second position, which provides the locked state. In addition, the cam lock 132 is configured to rotate from the second position, which provides the locked state, to the first position, which provides the unlocked state.

In an example embodiment, the cam lock 132 includes a handle 132A on an upper surface of the cam lock 132 such that the user is able to rotate the cam lock 132 with ease. In addition, in an example embodiment, the cam lock 132 has a cam surface 132B, which is ramp or ramp-like and which includes a lower part 132C and an upper part 132D. In this regard, for example, when the handle 132A is rotated in a first direction, the cam lock 132 is configured rotate into the first position in which the lower part 132C faces the rotatable member 122 to provide the unlocked state. In addition, when the handle 132A is rotated in a second direction, which is opposite to the first direction, the cam lock 132 is configured to rotate into the second position in which the higher part 132D faces the rotatable member 122 to provide the locked state.

In an example embodiment, when the cam lock 132 is in the first position and in the unlocked state, the cam surface 132B provides sufficient clearance for the rotatable member 130. More specifically, the lower part 132C of the cam surface 132B is positioned below one of the protruding portions 134A, 134B, and 134C of the rotatable member 122 such that there is a gap between the cam surface 132B and the corresponding protruding portion of the selected work surface. As a result of this gap, the rotatable member 122 is free to rotate in any direction. In contrast, when the cam lock 132 is in the second position and in the locked state, the upper part 132D of the cam surface 132B is configured to tightly abut against the corresponding protruding portion of the selected work surface of the rotatable member 122 such that the rotatable member 122 is unable to rotate.

In an example embodiment, the protruding portions 134A, 134B, and 134C are disposed on at least one end surface 122F of the rotatable member 122. As discussed above, each of the protruding portions 134A, 134B, and 134C is configured to engage and interact with the cam surface 132B of the cam lock 132. As shown in FIG. 8A, for example, each of the protruding portions 134A, 134B, and 134C protrude outward from the end surface 122F of the rotatable member 130. In this regard, each of the protruding portions 134A, 134B, and 134C is sized to engage with the cam surface 132B to provide the unlocked state and the locked state, as discussed above.

In an example embodiment, there is a one-to-one correspondence between each of the protruding portions 134A, 134B, and 134C and each of the work surfaces of the rotatable member 122. For example, in FIG. 8A, the protruding portion 134A corresponds to the first work surface 122A. Also, the protruding portion 134B corresponds to the second work surface 122B. In addition, the protruding portion 134C corresponds to the third work surface 122C. Accordingly, with these structural components, the cam lock 132 is configured to securely hold a selected one of the plurality of work surfaces of the rotatable member 122 such that the selected work surface is level or flush with the support surface 104A and available for use.

As discussed above, the rotatable member 122 provides a number of advantages. For example, the rotatable member 122 enables the user to quickly switch between multiple work surfaces without necessarily requiring the user to unscrew and screw a plurality of screws. In effect, this translates into improved efficiency and productivity. In addition, since the rotatable member 122 itself is configured to provide more than one work surface within the turntable 104, there is no need to store a conventional insert plate, as a spare, within a different region of the apparatus or elsewhere.

In addition, the rotatable member 122 enables a user to transition from one work surface to another work surface by a simple rotational movement. That is, the user does not need to use a tool, such as a screwdriver, to utilize a different work surface. In addition, after the selected work surface is in proper position, a user is able to quickly lock the selected work surface into position without using a tool, such as screwdriver, to do so. In this regard, the rotatable member 122 is beneficial in requiring less time, effort, and resources for a user to transition from one work surface to another work surface.

That is, the above description is intended to be illustrative, and not restrictive, and is provided in the context of a particular application and its requirements. Those skilled in the art can appreciate from the foregoing description that the disclosure may be implemented in a variety of forms, and that the various embodiments may be implemented alone or in combination. Therefore, while the embodiments of the disclosure have been described in connection with particular examples thereof, the general principles defined herein may be applied to other embodiments and applications without departing from the spirit and scope of the described embodiments, and the true scope of the embodiments and/or methods of the disclosure are not be limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A rotatable member mountable on a tabletop of a power tool apparatus, the rotatable member comprising:
   a first work surface on a first side of the rotatable member; and
   a second work surface on a second side of the rotatable member, the second side being different from the first side, wherein:
the tabletop includes a top surface defining a first plane; and the rotatable member is configured to move into (a) a first position in which only the first work surface is coplanar with the first plane, and (b) a second position in which only the second work surface is coplanar with the first plane.

2. The rotatable member of claim 1, wherein:
a movement of the rotatable member into the first position or the second position is a rotational movement about a rotational axis of the rotatable member, and
the rotational axis is parallel to the top surface of the tabletop.

3. The rotatable member of claim 1, further comprising:
at least one vent with at least one aperture on an edge portion of the rotatable member.

4. The rotatable member of claim 1, further comprising:
a third work surface on a third side of the rotatable member,
wherein:
the rotatable member is configured to move into a third position such that the third work surface is level with the top surface of the tabletop.

5. The rotatable member of claim 1, wherein:
the first work surface is a slotted work surface, and
the second work surface is a zero-clearance work surface.

6. The rotatable member of claim 1, further comprising:
an insert plate to provide the first work surface or the second work surface, the insert plate being attachable and detachable from the rotatable member.

7. The rotatable member of claim 1, wherein the rotatable member is configured to be in a locked state such that (a) the first work surface of the rotatable member is securely held in the first position when the rotatable member is in the first position, and (b) the second work surface of the rotatable member is securely held in the second position when the rotatable member is in the second position.

8. A rotatable member configured to rotate about a rotational axis that extends parallel to a main surface of a tabletop, the rotatable member comprising:
a first work surface on a first side of the rotatable member; and
a second work surface on a second side of the rotatable member, the second side being different from the first side;
wherein:
the rotatable member is configured to be in (a) a locked state in which the rotatable member is held in place and (b) an unlocked state in which the rotatable member is configured to (i) transition from the first work surface to the second work surface, and (ii) transition from the second work surface to the first work surface.

9. The rotatable member according to claim 8, wherein the first work surface is configured to be level with the main surface of the tabletop.

10. The rotatable member according to claim 8, wherein the second work surface is configured to be level with the main surface of the tabletop.

11. The rotatable member according to claim 8, further comprising:

a third work surface on a third side of the rotatable member,
wherein:
in the unlocked state, the rotatable member is configured to (i) transition from the first work surface or the second work surface to the third work surface and (ii) transition from the third work surface to the first work surface or the second work surface.

12. The rotatable member of claim 8, wherein:
the first work surface is a slotted work surface, and
the second work surface is a zero-clearance work surface.

13. The rotatable member of claim 8, further comprising:
an insert plate to provide the first work surface or the second work surface, the insert plate being attachable and detachable from the rotatable member.

14. A power tool apparatus comprising:
a turntable rotatable about a first rotational axis, the turntable including a rotatable member with a plurality of work surfaces including a first work surface on a first side of the rotatable member and a second work surface on a second side of the rotatable member; and
a power tool configured to operate on a selected one of the plurality of work surfaces of the rotatable member,
wherein:
the rotatable member is rotatable about a second rotational axis, the second rotational axis being perpendicular to the first rotational axis.

15. The power tool apparatus of claim 14, wherein the rotatable member is configured to rotate into a position such that the first work surface is level with a main surface of the turntable.

16. The power tool apparatus of claim 14, wherein the rotatable member is configured to rotate into a position such that the second work surface is level with a main surface of the turntable.

17. The power tool apparatus of claim 14, further comprising:
a third work surface on a third side of the rotatable member,
wherein:
the rotatable member is configured to rotate into a position such that the third work surface is level with a main surface of the turntable.

18. The power tool apparatus of claim 14, wherein:
the first work surface is a slotted work surface, and
the second work surface is a zero-clearance work surface.

19. The power tool apparatus of claim 14, further comprising:
an insert plate to provide the first work surface or the second work surface, the insert plate being attachable and detachable from the rotatable member.

20. The power tool apparatus of claim 14, further comprising:
a lock configured to provide the rotatable member with a locked state and an unlocked state,
wherein the rotatable member is configured to be in (a) the locked state in which the rotatable member is securely held in place by the lock and (b) the unlocked state in which the rotatable member is spaced from the lock and configured to (i) transition from the first work surface to the second work surface, and (ii) transition from the second work surface to the first work surface.

* * * * *